UNITED STATES PATENT OFFICE.

HUGO GELDERMANN, OF GROSS-LICHTERFELDE-OST, NEAR BERLIN, GERMANY, ASSIGNOR TO ACTIEN GESELLSCHAFT FÜR ANILIN FABRIKATION, OF BERLIN, GERMANY.

RED AZO DYE AND PROCESS OF MAKING SAME.

No. 880,292.      Specification of Letters Patent.      Patented Feb. 25, 1908.

Application filed November 6, 1907. Serial No. 400,986.

*To all whom it may concern:*

Be it known that I, HUGO GELDERMANN, a citizen of the German Empire, residing at Gross-Lichterfelde-Ost, near Berlin, Germany, and whose post-office address is Gross-Lichterfelde-Ost, near Berlin, Grabenstrasse 12, have invented certain new and useful Improvements in New Red Azo Dyestuffs and Processes of Making Same, of which the following is a specification.

I have found that new red azo-dyestuffs can be obtained by combining the tetrazo-compound of a mono- or polysulfonic acid of para-para$_1$-diaminophenylether with 2 molecular proportions of beta-naphthol. The products which I thus obtain dye wool in an acid bath without a mordant clear red tints which are more especially distinguished by a very good fastness to milling.

As to the production of the sulfonic acids of para-diaminophenylether serving as parent material for the manufacture of my new dyestuffs, I give the following particulars. Such a sulfonic acid of para-para$_1$-diaminophenylether, which ether is described in the *Berichte der Deutschen Chemischen Gesellschaft*, Vol. XXIX, page 1446 may be obtained by the sulfonation of this ether. On the other hand such mono- or disulfonic acid may also be prepared by condensing para-nitrochlorobenzene—ortho-sulfonic acid or a salt thereof with an alkali salt of para-nitrophenol or of a sulfonic acid of para-nitrophenol; finally a para-diaminophenylether-disulfonic acid may also be manufactured by sulfonating the corresponding monosulfonic acid by the action of hot fuming sulfuric acid. Thus for instance I mention the para-aminophenylether disulfonic acid, which may be obtained by the action of fuming sulfuric acid on the 4.4$_1$-diaminophenylether—2-monosulfonic acid; this new acid is difficultly soluble in water and can easily be diazotized in the usual manner by means of sodium nitrite and hydrochloric acid. The tetrazo-compound thus obtained is only slightly colored and also difficultly soluble in water.

The following example may serve to illustrate my invention, the parts being by weight: 20.2 parts of the sodium salt of the para-para$_1$-diaminophenylether-disulfonic acid, which acid may be obtained by the action of fuming sulfuric acid on the 4.4$_1$-diaminophenylether-2-monosulfonic acid, are diazotized in the usual manner in an aqueous solution by means of 55 parts of hydrochloric acid of 12° Baumé specific gravity and 7 parts of sodium nitrite. The tetrazo-compound thus obtained is allowed to react on an aqueous solution of 15 parts of beta-naphthol in 12 parts of soda lye of 40° Baumé specific gravity, such quantity of sodium carbonate being added that the solution has an alkaline reaction throughout the whole operation. The formation of the dyestuff being finished, the dyestuff separates; the product of the reaction is isolated by filtering, pressing and drying. The dyestuff thus obtained when pulverized forms a red powder which dissolves in water to a red solution which solution on the addition of some concentrated soda lye becomes a little more bluish and darker and on the addition of some concentrated hydrochloric acid separates red flakes, whereas by adding some concentrated liquor ammoniæ it is only changed very slightly.

The new coloring matter is soluble in alcohol with a yellow coloration and dissolves in concentrated sulfuric acid to a red solution, which on the addition of ice is precipitated in red flakes; it is very characteristic that a diluted solution of the dyestuff in concentrated sulfuric acid is bluish red or even blue-red. By the action of strong reducing agents the dyestuff is split up yielding para-para$_1$-diaminophenylether disulfonic acid besides 1.2-aminonaphthol. This new dyestuff dyes wool without a mordant in an acid bath, and more especially in an acid bath containing acetic acid, pure and intense red tints which are very fast to milling.

It is obvious to those skilled in the art that I do not limit my invention to the foregoing example or to the details given therein. For instance if for the para-para$_1$-diaminophenylether disulfonic acid a monosulfonic acid is substituted and if the tetrazo-compound of such a monosulfonic acid is combined with two molecular proportions of beta-naphthol a red disazo-dyestuff is obtained which also dyes wool in an acid bath clear and intense red tints, very fast to milling.

Having now described my invention and the manner in which the same may be performed, what I claim is,—

1. The hereinbefore-described new red azo-dyestuffs which may be obtained by diazotizing a para-para$_1$-diamino-phenylether sulfonic acid, combining the tetrazo-compound thus obtained with two molecular proportions of beta-naphthol, which new dyestuffs dye wool from an acid bath without a mordant, and more especially from an acetic acid bath, clear and intense red tints which are fast to milling and which coloring matters when pulverized form a red powder and dissolve in water to a red solution, from which solution by the addition of mineral acids the free acid of the dyestuff is precipitated, whereas by adding some concentrated liquor ammoniæ the aqueous solution is only slightly changed, which new dyestuffs are soluble in alcohol with a yellow coloration and dissolve in concentrated sulfuric acid to a red solution, and which new coloring matters by the action of strong reducing agents are split up, yielding a para-para$_1$-diaminophenylether sulfonic acid besides 1.2-aminonaphthol.

2. The hereinbefore - described new red azo-dyestuff having in the shape of the sodium salt the formula:

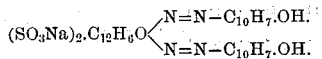

which dyestuff may be obtained by diazotizing the para-para$_1$-diaminophenylether disulfonic acid, combining the tetrazo-compound thus obtained with two molecular proportions of beta-naphthol, which new dyestuff dyes wool from an acid bath without a mordant, and more especially from an acetic acid bath, clear and intense red tints which are fast to milling, and which coloring matter when pulverized forms a red powder which dissolves in water to a red solution, which solution on the addition of some concentrated soda-lye becomes a little more bluish and darker and on the addition of some concentrated hydrochloric acid separates red flakes, whereas by adding some concentrated liquor ammoniæ it is only changed very slightly, which new coloring matter dissolves in alcohol to a yellow solution and in concentrated sulfuric acid to a red solution, which solution on the addition of ice is precipitated in red flakes, whereas a diluted solution of the dyestuff in concentrated sulfuric acid is bluish red or even blue-red, and which new dyestuff by the action of strong reducing agents is split up yielding para-para$_1$-diaminophenyl ether disulfonic acid besides 1.2-aminonaphthol.

In testimony whereof I have hereunto set my hand in presence of two subscribing witnesses.

HUGO GELDERMANN.

Witnesses:
WOLDEMAR HAUPT,
HENRY HASPER.